United States Patent [19]

Gehring

[11] Patent Number: 5,896,003
[45] Date of Patent: Apr. 20, 1999

[54] COMPACT FLUORESCENT LAMP AND METHOD FOR MANUFACTURING THE SAME

[75] Inventor: Gotthold R. Gehring, Schmitten, Switzerland

[73] Assignee: Samsung Display Devices Co., Ltd., Suwon-si, Rep. of Korea

[21] Appl. No.: 08/769,729

[22] Filed: Dec. 18, 1996

[30] Foreign Application Priority Data

Dec. 21, 1995 [KR] Rep. of Korea ............... 95-45128 U

[51] Int. Cl.$^6$ ................................................. H01J 9/24
[52] U.S. Cl. ........................... 445/26; 445/25; 445/40
[58] Field of Search ............................ 313/493, 634, 313/573; 445/42, 22, 25, 26, 53, 40

[56] References Cited

U.S. PATENT DOCUMENTS

| | | | |
|---|---|---|---|
| 4,853,591 | 8/1989 | Klein et al. | 313/493 |
| 4,881,007 | 11/1989 | Egelstam | 445/22 X |
| 5,801,484 | 9/1998 | Bankuti et al. | 313/493 |

FOREIGN PATENT DOCUMENTS

| | | |
|---|---|---|
| 0143419 | 6/1985 | European Pat. Off. . |
| 0204061 | 12/1986 | European Pat. Off. . |
| 19626710 | 1/1997 | Germany . |
| 63-021723 | 1/1988 | Japan . |
| 1213939 | 8/1989 | Japan . |
| 1235127 | 9/1989 | Japan . |
| 4002028 | 1/1992 | Japan . |
| 5036356 | 2/1993 | Japan . |
| 5182588 | 7/1993 | Japan . |

*Primary Examiner*—Ashok Patel
*Attorney, Agent, or Firm*—Christie, Parker & Hale, LLP

[57] ABSTRACT

The present invention provides a compact fluorescent lamp which includes a number of glass tubes in which fluorescent material is applied on the inner surface, and in which mercury steam and noble gas is injected. Also, the glass tubes are connected so that they are communicable with each other, and electrodes are inserted and sealed in one side of the glass tubes. In the end portions of the glass tubes where electrodes are not inserted, sealing is accomplished through heat from burners.

4 Claims, 2 Drawing Sheets

COMPACT FLUORESCENT LAMP AND METHOD FOR MANUFACTURING THE SAME

BACKGROUND

The present invention relates to a compact fluorescent lamp and a method for manufacturing the same, and more particularly, to a compact fluorescent lamp and a method for manufacturing the same in which seams of glass tube end portions are smooth and that externally look attractive.

Generally, fluorescent lamps have discharge electrodes formed on both sides of a glass tube, on the inside surface of which a fluorescent material is applied. Inside the glass tube, which is in a vacuum state, mercury steam and noble gas are injected.

In fluorescent lamps like that of the above, when high-voltage current is applied to the discharge electrodes, a flow of electron beams is formed inside the glass tube by the discharge current. This flow of electron beams and the mercury steam collide and the resulting ultraviolet beam excites the fluorescent material applied on the inside surface of the glass tube. This, in turn, leads to the emitting of a visible ray. It is through this principle that light is radiated.

Compact fluorescent lamps radiate light using the same principle of the above fluorescent lamps. However, the shape of compact fluorescent lamps is different from that of normal fluorescent lamps.

Namely, compact fluorescent lamps have a number of glass tubes in a fixed shape inside of which mercury steam and noble gas are able to mutually flow. The glass tubes are connected to each other by a connecting means, and electrodes are sealed in the glass tubes.

In this way, prior art compact fluorescent lamps possess a number of glass tubes. Compact fluorescent lamps of this type are disclosed in U.S. Pat. No. 4, 853.591.

In the above prior art, the glass tubes are U-shaped and there are at least two of these U-shaped glass tubes. In addition, the glass tubes come to be connected to each other through a connecting means.

Furthermore, on one side of both ends of the glass tubes, electrodes are inserted and sealed, and on the other ends of the glass tubes, where there are no electrodes, the end portions are pinch-sealed.

A problem related to the attractiveness of the prior art compact fluorescent lamp arises when pinch sealing the glass ends opposite the ends having electrodes. When this pinch-sealing operation is performed, marks are left from the pinch mold. As a result, the glass tubes look unattractive.

SUMMARY

The present invention has been made in an effort to solve the above problem.

It is an object of the present invention to provide a compact fluorescent lamp and a method for manufacturing the same in which the sealing of end portions, where electrodes are not inserted, is done so that the end portions are smooth and in which glass tubes of the compact fluorescent lamp are externally pleasing to the eye.

To achieve the above object, the present invention provides a compact fluorescent lamp which includes a number of glass tubes in which fluorescent material is applied on the inner surface, and in which mercury steam and noble gas are injected. Also, the glass tubes are connected so that they communicate with each other, and electrodes are inserted and sealed in one side of the glass tubes.

According to another aspect of the present invention, a method for making a compact fluorescent lamp comprising a glass tube, in which a fluorescent material is applied and mercury steam and noble gas are injected, characterized in that an end portion of the glass tube is sealed by heating the end portion using a heating means rather than by a pinch-mold is provided.

In the end portions of the glass tubes where electrodes are not inserted, sealing is accomplished through heat from burners.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DESCRIPTION

Preferred embodiments of the present invention will now be described in detail with reference to the accompanying drawings.

Figure 1:
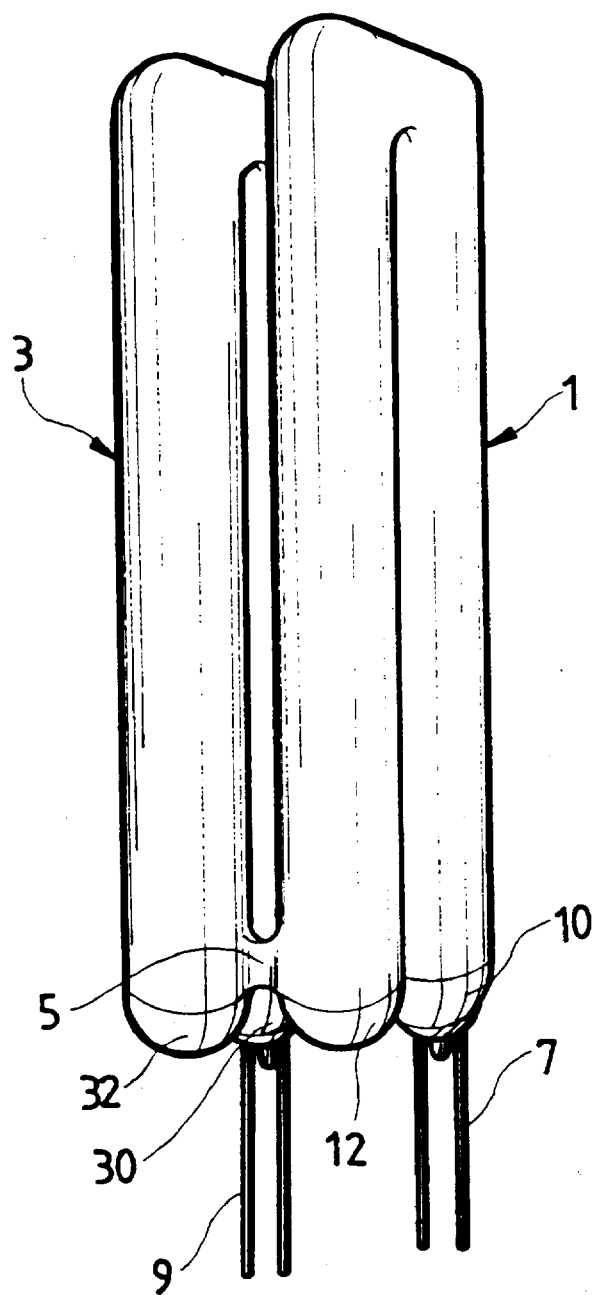
FIG. 1 is a perspective view of a compact fluorescent lamp in accordance with a preferred embodiment of the present invention.

FIG. 1 is a perspective view of a compact fluorescent lamp in accordance with a preferred embodiment of the present invention. The reference numerals 1 and 3 indicate glass tubes that form the compact fluorescent lamp.

As in the prior art compact fluorescent lamp, the present invention has a number of glass tubes 1 and 3. These glass tubes 1 and 3 have a fluorescent material applied to the inside surface, and mercury steam and noble gas are injected into the glass tubes 1 and 3.

In addition (and also identical to that of the prior art), the lower part of the glass tubes 1 and 3 are connected and, thus are communicable through a connecting member 5.

Also, on one side of the end portions 10,12,30,32 of the glass tubes 1 and 3, electrodes 7 and 9 are inserted and then sealed, and the other side (end portions 12 and 32) is sealed without electrodes.

Figure 2:
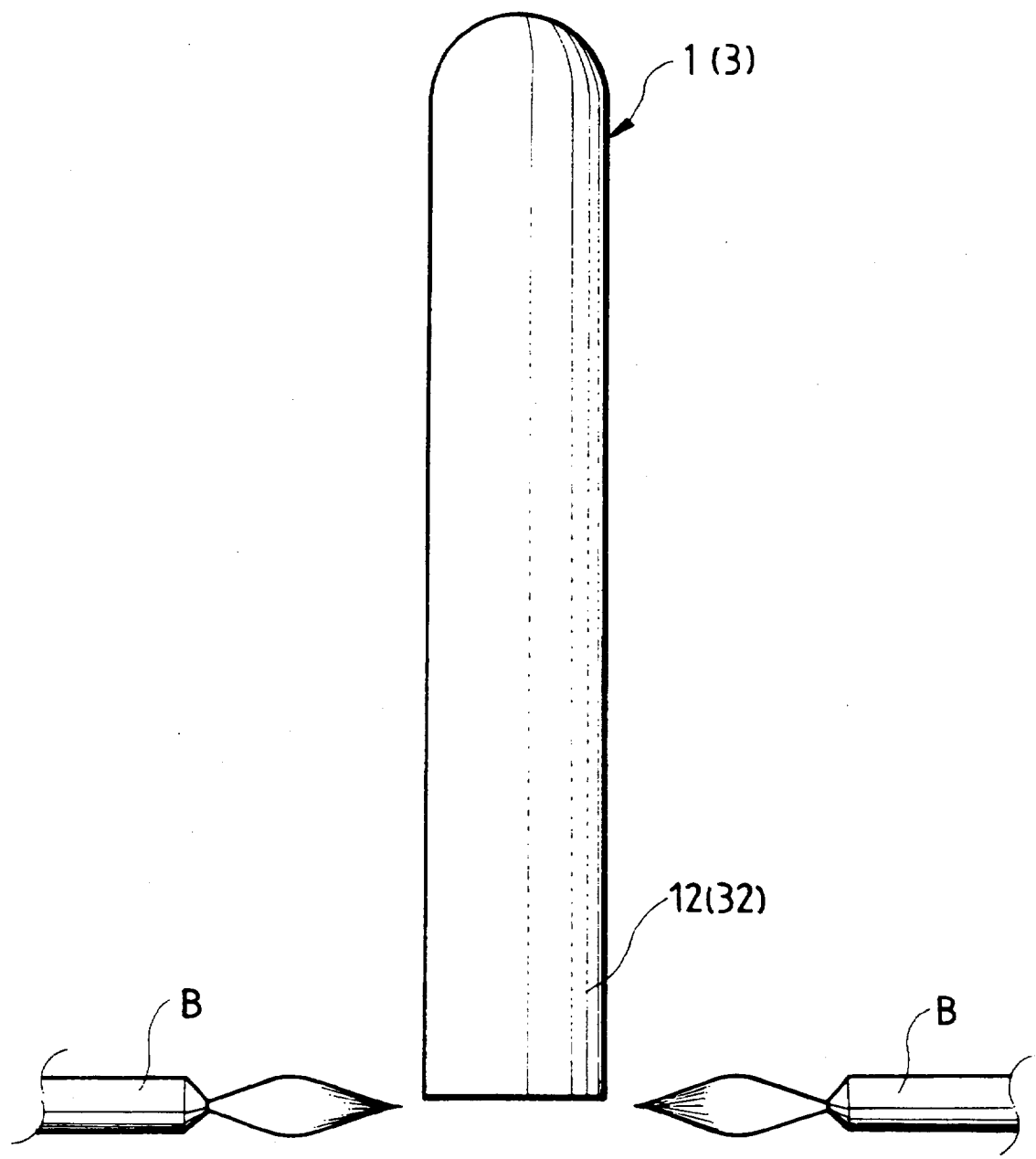
FIG. 2 is a detail view which will be used in explaining a method of sealing end portions of glass tubes in accordance with a preferred embodiment of the present invention.

In the present invention, the sealing of the end portions 12 and 32 is accomplished differently from that of the prior art. As illustrated in FIG. 2, burners B, disposed on both sides of the end portions 12 and 32, apply heat to the end portions 12 and 32.

If the end portions 12 and 32 are sealed through heat applied by the burners B, the end portions 12 and 32 become smooth, similar to the way they appear in FIG. 1.

In the present invention, as a special manufacturing tool is not used to seal the end portions 12 and 32 of the glass tubes 12 and 32, and because this sealing is achieved through the use of heat, the leaving of marks (as is the case in the prior art) through the use of such a tool for sealing can be prevented.

So, in the compact fluorescent lamp according to the present invention, the seal on the end portions where the electrodes are not inserted is accomplished so as to be much smoother than that of the prior art. As a result, the present invention is externally attractive. Also, because the sealing operation is done through burners, the manufacturing process is simplified.

While this invention has been described in connection with what is presently considered to be the most practical and preferred embodiment, it is to be understood that the invention is not limited to the disclosed embodiment, but, on the contrary, it is intended to cover various modifications and equivalent arrangements included within the spirit and scope of the appended claims.

What is claimed is:

1. A method for making a compact fluorescent lamp comprising the step of sealing an end portion of a glass tube by heating opposing sides of the end portion, each of the opposing sides being heated with a separate heating device.

2. A method according to claim 1 wherein each of the heating devices comprises a burner.

3. A method according to claim 1 further comprising the steps of applying a fluorescent material to the glass tube, and inserting mercury steam and noble gas in said glass tube.

4. A method according to claim 1 wherein the heating step is performed with the heating devices disposed on the opposing sides of the end portion of the glass tube.

* * * * *